US010723476B2

(12) United States Patent
Zaccardi et al.

(10) Patent No.: US 10,723,476 B2
(45) Date of Patent: Jul. 28, 2020

(54) RING OF TURBOJET VANES INCLUDING AN ACOUSTIC TREATMENT STRUCTURE

(71) Applicant: SAFRAN AIRCRAFT ENGINES, Paris (FR)

(72) Inventors: Cedric Zaccardi, Saint Maur des Fosses (FR); Christophe Marcel Lucien Perdrigeon, Ballainvilliers (FR); Francois Marie Paul Marlin, Villiers sous Grez (FR); Thierry Georges Paul Papin, Varennes-Jarcy (FR); Jacky Novi Mardjono, Nogent sur marne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/185,257

(22) Filed: Nov. 9, 2018

(65) Prior Publication Data
US 2019/0152618 A1 May 23, 2019

(30) Foreign Application Priority Data

Nov. 10, 2017 (FR) ...................................... 17 60612

(51) Int. Cl.
*F02K 1/34* (2006.01)
*F01D 9/02* (2006.01)
(Continued)

(52) U.S. Cl.
CPC ............... *B64D 33/06* (2013.01); *F01D 9/02* (2013.01); *F01D 9/026* (2013.01); *F01D 9/041* (2013.01);
(Continued)

(58) Field of Classification Search
CPC . B64D 33/06; F01D 9/02; F01D 9/026; F01D 9/041; F02C 7/24; F02C 7/045;
(Continued)

(56) References Cited

U.S. PATENT DOCUMENTS 4,751,979 A * 6/1988 Wiseman ................... F02C 7/24
181/213
5,083,900 A * 1/1992 Carletti .................... F01D 9/042
415/191

(Continued)

FOREIGN PATENT DOCUMENTS

| CA | 2 697 292 A1 | 9/2011 |
| EP | 0 433 111 A1 | 6/1991 |
| WO | WO 2011/034469 A1 | 3/2011 |

OTHER PUBLICATIONS

French Preliminary Search Report dated Apr. 24, 2018 in French Application 17 60612, filed on Nov. 10, 2017 (with English Translation of Categories of Cited Documents).

*Primary Examiner* — Nathaniel E Wiehe
*Assistant Examiner* — Ryan C Clark
(74) *Attorney, Agent, or Firm* — Oblon, McClelland, Maier & Neustadt, L.L.P.

(57) ABSTRACT

A ring of vanes for an aircraft turbine engine, the ring presenting an axial direction and a radial direction and including a first annular sheath presenting an inside surface and a second annular sheath presenting an inside surface facing the first inside surface of the first annular sheath, the first and second sheaths being coaxial and defining between them a flow passage for a gas stream. The ring further includes both partially annular acoustic treatment panels including resonant cavities and also vanes extending in the radial direction between the first and second sheaths. Each vane includes a radial airfoil with at least two attachment tabs at each radial end of the airfoil fastened to the first or
(Continued)

second sheath, and the inside surface of at least one of the first and second annular sheaths and the corresponding attachment tabs are covered by acoustic treatment panels arranged between the airfoils.

15 Claims, 4 Drawing Sheets (51) Int. Cl.
   *F01D 9/04* (2006.01)
   *F02C 7/24* (2006.01)
   *F02K 3/04* (2006.01)
(52) U.S. Cl.
   CPC .................. *F02C 7/24* (2013.01); *F02K 3/04* (2013.01); *F05D 2240/12* (2013.01); *F05D 2260/96* (2013.01)
(58) Field of Classification Search
   CPC ........ F02K 3/04; F02K 1/827; F05D 2240/12; F05D 2250/293; F05D 2250/191; F05D 2260/963
   See application file for complete search history.

(56) References Cited

U.S. PATENT DOCUMENTS

| | | | |
|---|---|---|---|
| 2003/0031556 A1* | 2/2003 | Mulcaire | F01D 5/00 415/119 |
| 2010/0314082 A1* | 12/2010 | Porte | B64D 15/04 165/157 |
| 2012/0168248 A1* | 7/2012 | Burak | F01D 25/162 181/292 |

* cited by examiner

FIG.7

RING OF TURBOJET VANES INCLUDING AN ACOUSTIC TREATMENT STRUCTURE

CROSS-REFERENCE TO RELATED APPLICATIONS

The present application claims priority to French Patent Application No. 1760612, filed on Nov. 10, 2017, the entire contents and disclosure of which is hereby incorporated by reference herein.

BACKGROUND OF THE INVENTION

The present invention relates to the general field of so-called "passive" acoustic treatment, and particularly, but not exclusively, in its application to aviation turbine engines.

The invention relates more particularly to a ring of vanes of an aircraft turbine engine, and more particularly to the acoustic treatment of the ring.

The use of passive acoustic treatment panels is frequent in the field of aviation for the purpose of reducing sound emissions from turbine engines. For example, for a turbojet of the two-spool bypass type, such panels may be arranged on the inside face of the nacelle of the turbojet, and also on the inside and outside faces of its primary cover.

A passive acoustic treatment panel is generally made up of a structure forming resonant cavities that is covered by a thin porous layer (also referred to as a perforated skin) acting as a passive wall and closed at its other end by a layer that is reflective from an acoustic point of view (also referred to as a solid skin).

In the context of general specifications concerning noise, which are becoming ever more constraining concerning reducing noise level, and in particular in the context of nacelles that are narrow and short where surface areas available for potential acoustic treatment are becoming smaller and smaller, it is difficult to satisfy the general specifications in conventional manner. Specifically, there is less room for installing the equipment, in particular acoustic panels, that is used for attenuating noise from the fan. Thus, the volume of the equipment becomes a major problem, as does integrating it, in particular installing acoustic panels in the secondary passage of the engine.

Furthermore, in a ring of vanes, also known as outlet guide vanes (OGV), the surfaces of the air flow passage are built up from auxiliary parts such as platforms mounted between the outlet guide vanes so as to be interposed close to the roots and close to the tips of those vanes. Generally, acoustic treatment panels are used immediately upstream and downstream from the rings of outlet guide vanes. The ring itself generally does not have acoustic treatment, thereby reducing the area of the acoustic treatment and also reducing the effectiveness of the acoustic treatment.

Such rigid platforms without acoustic treatment, and thus forming a zone of acoustic leakage, can also be excited by the secondary stream, thereby adding to design constraints.

The platforms forming the inner and outer shrouds of the ring and making up the surfaces of the air flow passage through the ring of outlet guide vanes generally include a large amount of ribbing in order to strengthen the platforms and reduce any risk of the integrity of the ring structure being degraded.

Rings of vanes for a turbojet are known that include sound attenuation panels with resonant cavities, the panels being inserted in recesses made in platform portions and in vane portions.

Nevertheless, those panels are capable of covering only a fraction of the surface of the shroud made up of the platforms of the vanes, which shroud may be thought of as an annular sheath. Specifically, in order to conserve the integrity of the structure of the ring, a recess can be made in only a portion of the platform.

OBJECT AND SUMMARY OF THE INVENTION

The invention seeks to propose a ring of vanes for a turbine engine that maximizes the acoustic treatment for at least one of the inner or outer shrouds in order to reduce the propagation of soundwaves out from the turbine engine.

The invention provides a ring of vanes for an aircraft turbine engine, the ring presenting an axial direction and a radial direction and comprising a first annular sheath presenting a first inside surface and a second annular sheath presenting a second inside surface facing the first inside surface of the first annular sheath. The first and second sheaths are coaxial and define between them a flow passage for a gas stream. The ring further comprises acoustic treatment panels including resonant cavities. Vanes extend in the radial direction between the first sheath and the second sheath. Each of these vanes includes at least two attachment tabs at each radial end.

According to a general characteristic of the invention, firstly, each vane includes a radial airfoil with said attachment tabs at each radial end of the airfoil fastened to the first or second sheath, and secondly, the inside surface of at least one of the first and second annular sheaths and the corresponding attachment tabs are covered by acoustic treatment panels arranged between the airfoils.

The acoustic treatment panels of the ring of the invention thus serve to combine two functions simultaneously: an acoustic function of treating the soundwaves from the flow passage and an aerodynamic function relating to forming platforms in inter-vane inserts to enable an annular sheath to be formed. The invention thus makes it possible to provide acoustic treatment panels that perform both of the functions, while improving the mechanical strength of the annular sheath and minimizing its weight. The inter-vane inserts having acoustic and aerodynamic functions also serve to handle correctly mechanical strength constraints, architectural integration problems, and assembly and fastening constraints.

The resonant cavities of the acoustic treatment panels serve in particular to maximize attenuation over a target frequency range, such as for example a range extending from 400 hertz (Hz) to 4 kHz, e.g. for a ducted fan turbine engine having an ultra-high bypass ratio (UHBR). The fan of such a machine raises major acoustic constraints.

The invention makes it possible to extend the acoustic treatment area between the vanes of the ring by making use of all of the volume that is available between the vanes and outside the flow passage for performing acoustic treatment, while increasing the strength and the retention of the platforms, and while decreasing complexity compared with known platforms, where complexity is generally due to a large number of large ribs.

The ring of the invention makes it possible to achieve a gain of 35% in terms of acoustic treatment area while still building up the aerodynamic passage between the vanes. Specifically, the ring makes it possible to apply acoustic treatment over about 60% of the area of the platform in contact with the secondary stream. The acoustic treatment of the platforms increases the area that is treated acoustically downstream from the fan by 20% to 40% compared with solutions known in the state of the art.

The acoustic treatment panels forming the platforms in the inter-vane inserts combine aerodynamic and acoustic functions over a maximum volume between the attachment tabs of the vanes.

Also, according to a general characteristic of the invention, each acoustic treatment panel comprises a partially annular platform and a cover co-operating with the platform to form a box, the platform presenting a first face facing the flow passage and a second face opposite from the first face and from which the cover extends projecting in the radial direction, the box including a housing defined by the inside space extending between the second face of the platform and the cover, and having said resonant cavities arranged therein.

The box closed by its cover serves to control the behavior of the acoustic treatment better than an insert that is open at one end of the resonant cavities. The effects of the acoustic treatment in a solution with an insert that is open at one end of the resonant cavities are difficult to predict accurately, in contrast to a box that is closed. This lack of accuracy is due to a lack of reliable definition for the acoustic cavity, given the clearances that result relative to the casings on which the platforms are fastened between the vanes.

In a first aspect of the ring of vanes, the platform of each acoustic treatment panel may include through orifices enabling the flow passages to communicate with the resonant cavities in the acoustic treatment panel.

The orifices in the platform, also considered as perforations in a skin, are very effective at performing the acoustic function of the acoustic treatment panel. The soundwaves coming from the flow passage can be transmitted to the resonant cavities in the acoustic treatment panels via the orifices.

In a second aspect of the ring of vanes, the platform of each acoustic treatment panel presents a perforation fraction lying in the range 5% to 12% of the area covered by the platform.

The perforation fraction lying in the range 5% to 12% enables good acoustic performance to be obtained.

By covering the first or second annular sheets, the acoustic treatment panels form an annular acoustic treatment sheath that then presents a sandwich type structure similar to that of the acoustic treatment panels. The annular acoustic treatment sheath thus comprises a first layer formed by the platform, which can be thought of as a first wall, a second layer formed by a structure presenting resonant cavities, and a third layer formed by the cover, which can be thought of as a second wall, the second layer extending between the first and third layers. This sandwich type structure presents an optimum ratio of stiffness to weight that provides the panel and thus the annular sheath with strength when subjected to mechanical and aerodynamic stresses, i.e. that provides the panel with good vibration behavior and good strength against the pressure difference exerted on the acoustic treatment panel.

In a third aspect of the ring of vanes, the platform of each acoustic treatment panel extends over an annular portion greater than the annular portion described by the cover, the box formed by assembling the cover with the platform defining a bearing surface on its outer periphery for receiving a sealing gasket.

Where appropriate, fastener elements may be provided for connecting the panel to the attachment tabs of a vane or with another acoustic treatment panel. For example, these may comprise upstream and/or downstream fastener tongues that are caused to cooperate with corresponding arrangements in the casing of the ring of vanes.

Trimming the box serves to maximize the acoustic treatment area by integrating firstly the location for receiving a sealing gasket that is to cooperate with the portions of the casing that are upstream and downstream from the ring relative to the flow direction of the gas stream in the flow passage, and secondly the locations of the orifices, or of the bolts, or of the fittings used for fastening the panels with the vane, or indeed enabling the panels to be fastened to one another.

A fourth aspect of the ring of vanes, each acoustic treatment panel may include at least one resilient damper mounted on the second face of the platform. For example, the resilient damper passes through the cover in the radial direction.

Resilient dampers, or "bumpers", serve to attenuate the vibration of the shroud-forming acoustic treatment panels.

In a fifth aspect of the ring of vanes, the cover may include an acoustically reflective layer.

In a sixth aspect of the ring of vanes, the box may include partitions arranged in the housing and extending in the radial direction between the outside face of the platform and the cover.

The partitions serve to stiffen the acoustic treatment panel and thus to improve the structural strength of the treatment panels under aerodynamic and/or vibratory stresses. The partitions can also be used directly for forming the resonant cavities inside the boxes of the acoustic treatment panels.

Frequency matching, i.e. the optimization that makes it possible to achieve maximum dissipation at the frequencies that are to be attenuated, is undertaken for the most part via the volume of the resonant cavities. The geometrical characteristics of the resonant cavities, and thus of the partitions, are defined as a function of the target acoustic performance.

In an embodiment of the sixth aspect, the partitions may be shaped to form cavities that are radially curved.

Curved cavities serve to improve attenuation at low frequencies in small volumes, in particular if the height of the housing in the radial direction is limited.

In a seventh aspect of the ring of vanes, each acoustic treatment panel may comprise a porous material arranged in the housing of the box and defining said resonant cavities.

The porous materials may be foams or indeed viscoelastic materials.

In a variant, each acoustic treatment panel may comprise a honeycomb structure mounted in the housing of the box and forming cells defining said resonant cavities.

The honeycomb structure presents the advantage of forming both the resonant cavities and also the partitions or ribs for stiffening the acoustic treatment panel.

In another embodiment, each acoustic treatment panel may also include active acoustic treatment means, such as piezoelectric means, arranged inside the resonant cavities.

In an aspect of the ring of vanes, the platform and the cover of each acoustic treatment panel are made of carbon composite material or of glass composite material.

Making the platform and the cover out of carbon or glass composite material serves to provide the acoustic treatment panel with additional stiffness.

In a ninth aspect of the ring of vanes, each acoustic treatment panel includes radial fastener orifices for fastening the panel to the first or second annular sheath, each radial fastener orifice passing through the box in the radial direction from the platform to the cover, the box further including a setback zone without any resonant cavities around each radial fastener orifice.

The setback zones, which are kept free of resonant cavities around the fastenings of the acoustic treatment panel to the first or second annular sheath, enable metal fittings to be incorporated around the fastenings and enable the remaining space between the fitting and the resonant cavities to be filled with polymer. This serves to obtain a transition between the fastening and the resonant cavities. Without this transition, the strength of the platform would be of poorer quality and the platform might be torn out.

The invention also provides a turbine engine including a ring of vanes as defined above.

The invention also provides an aircraft including a turbine engine as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
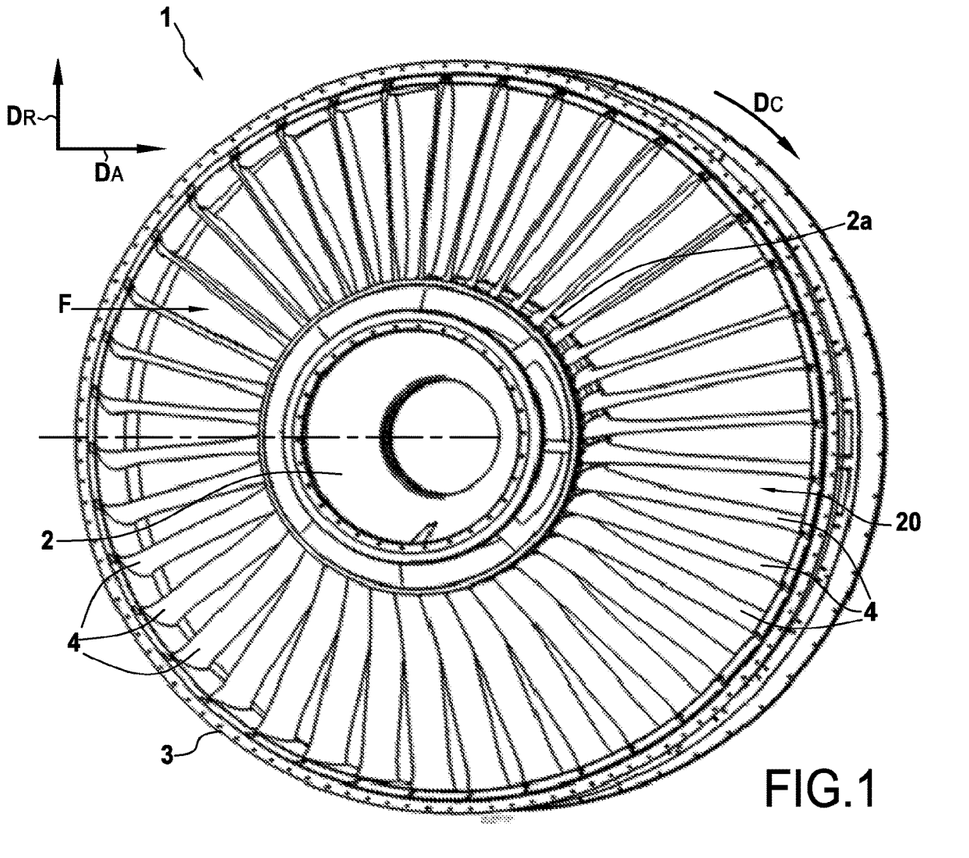
FIG. 1 is a diagrammatic perspective view of a ring of vanes in an embodiment of the invention.
Figure 2:
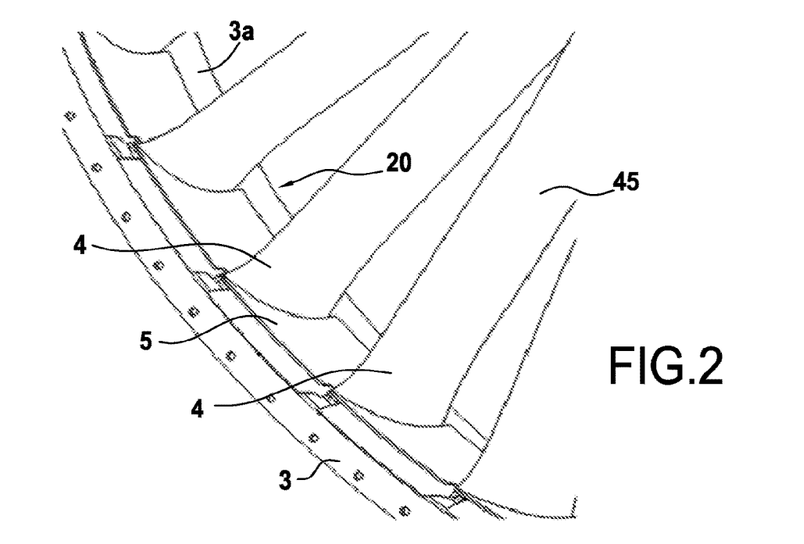
FIG. 2 is an enlargement of a portion of the FIG. 1 ring.

FIG. 1 is a diagrammatic perspective view of a ring of vanes of an aircraft turbine engine in an embodiment of the invention, and FIG. 2 is an enlargement of a portion of FIG. 1.

The ring 1 shown in FIGS. 1 and 2 is a ring of outlet guide vanes. It has an axial direction $D_A$, a radial direction $D_R$, and a circumferential direction $D_C$. The ring 1 has an inner shroud 2, an outer shroud 3, and guide vanes 4, each extending in the radial direction $D_R$.

In this embodiment, the outer shroud 3 comprises a metal annular casing presenting an inside surface 3a having a succession of partially annular panels 5 assembled thereon. The panels 5 are inter-vane inserts constituting acoustic treatment panels, each having an acoustic treatment structure forming resonant cavities.

Figures 3, 4:
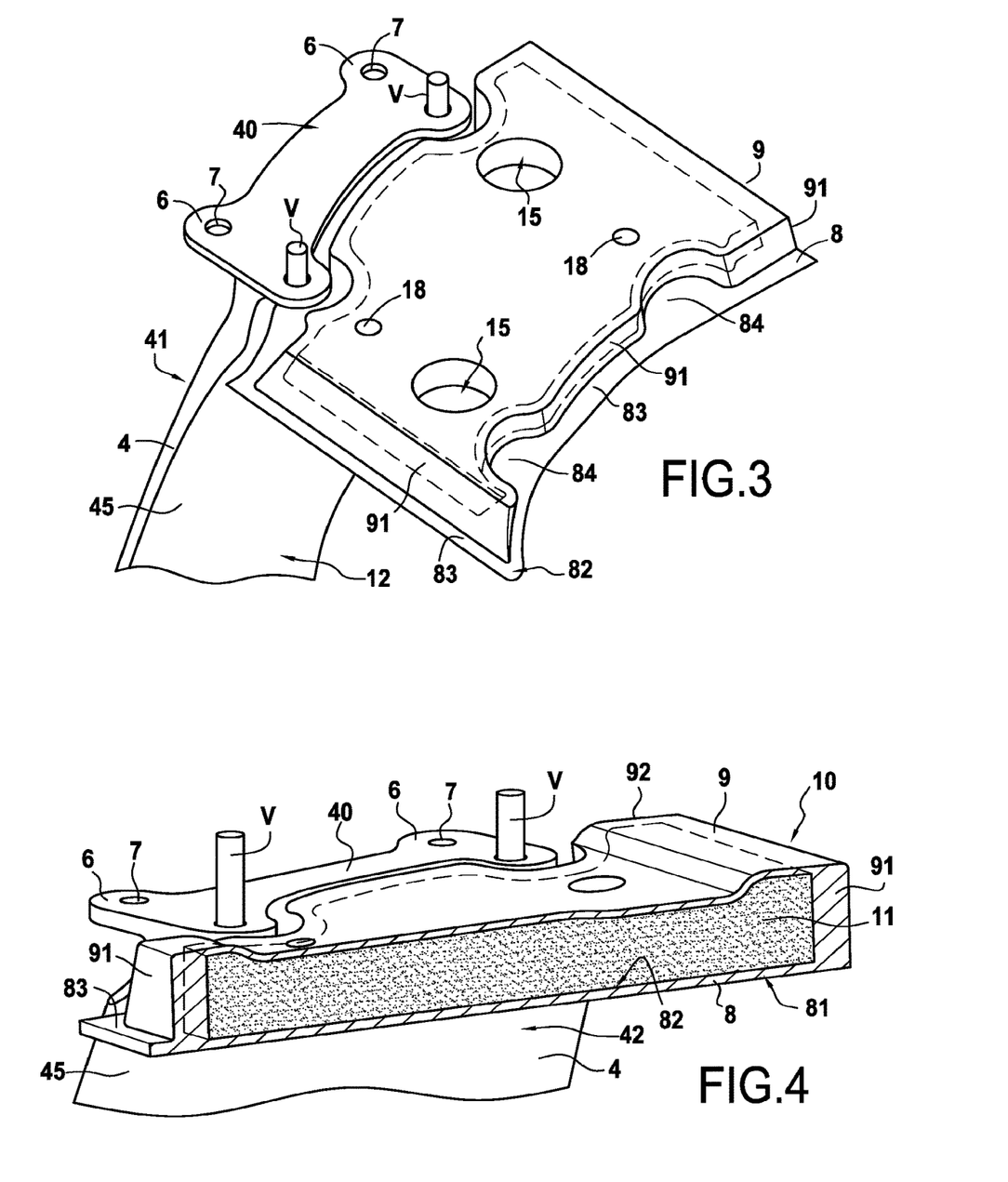
FIGS. 3, 4, and 5 are respectively a diagrammatic perspective view, a truncated diagrammatic perspective view, and a diagrammatic plan view of a vane and an acoustic treatment panel for the FIG. 1 ring.
Figure 5:
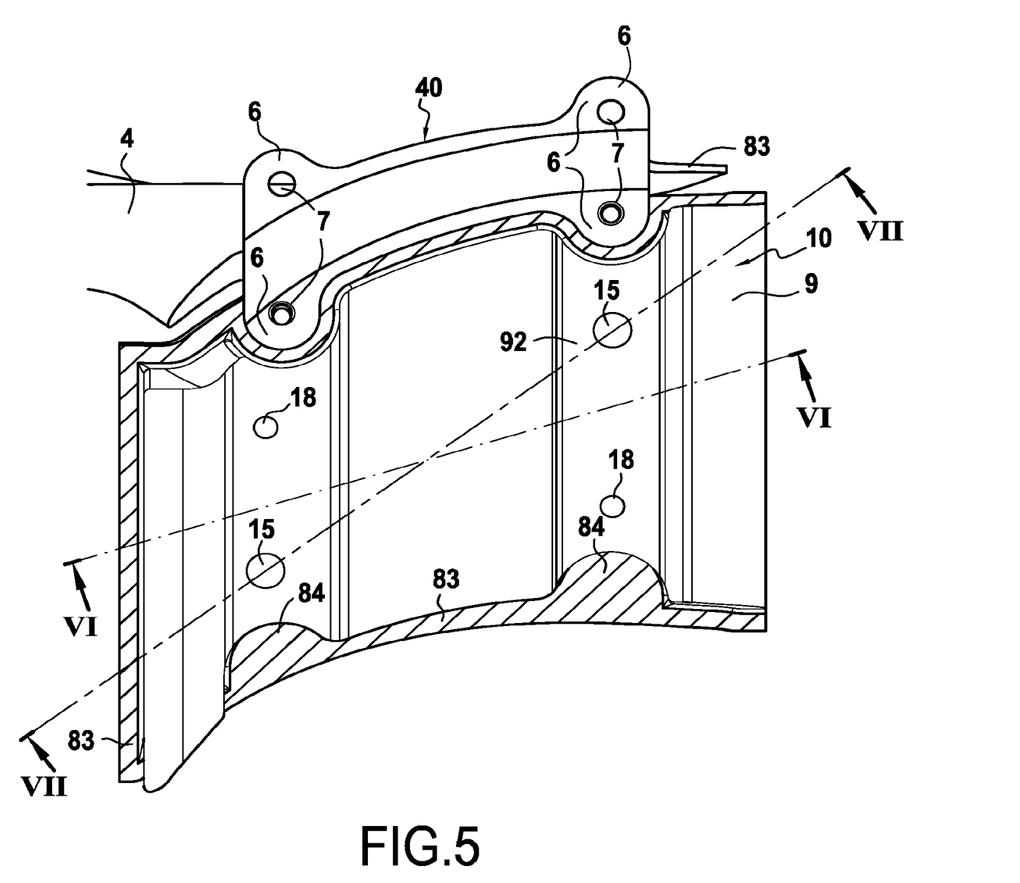

As shown in FIGS. 3, 4, and 5, which are respectively a diagrammatic perspective view, a truncated diagrammatic perspective view, and a plan view of a vane 4 and an acoustic treatment panel 5 of the ring 1 of FIGS. 1 and 2, each vane 4 comprises a radial airfoil 45 and four fastener tabs 6 at a radially outer end 40 of the airfoil 45 co-operating with the panels 5 to form the outer shroud 3, the four fastener tabs 6 extending in the circumferential direction $D_C$ of the ring 1. Two attachment tabs 6 extend from a first side 41 of the airfoil 45 of the vane 4 to project away from the airfoil 45, and two attachment tabs 6 extend from a second side 42 of the airfoil 45 of the vane 4, opposite from the first side 41, to project from the airfoil 45. Each attachment tab 6 is provided with an orifice 7 enabling a bolt V to be inserted for co-operating with a nut in order to secure a vane 4 to the outer shroud 3. In another embodiment, the bolt and the orifices 7 serve to secure a panel 5 and the vane 4 together with the outer shroud 3.

As shown in FIGS. 3 to 5, each panel 5 comprises a platform 8 forming a partially annular wall serving to reconstitute an annular wall when the outer shroud 3 is covered by a plurality of panels 5 that are assembled together, thereby co-operating with the inner shroud 2, or the panels 5 covering the inner shroud 2, to form a flow passage 20 for a gas stream F, shown in FIG. 1. The platform 8 presents an inside face 81 facing the flow passage 20 and the inner shroud 2, and an outside face 82 radially opposite from the inside face 81 and facing an annular ring support structure (not shown) that is arranged around the ring 1.

In a variant, the ring need not include inner and outer shrouds 2 and 3, with the shrouds or annular sheaths being formed by assembling the panels 5 together with the attachment tabs 6 of the vanes 4 to form a ring.

Each panel 5 also includes a cover 9 projecting from the outside face 82 of the platform 8. The cover 9 and the platform 8 together form a box 10. The cover 9 has four radial walls 91 projecting in the radial direction $D_R$ from the outside face 82 of the platform 8, and an annular wall 92 extending substantially parallel to the platform 8 from a first end 911 of the radial walls 91 remote from a second end 912 of the radial ends 91 secured to the outside face 82 of the platform 8. The annular wall 92 constitutes a box bottom wall of the panel 5.

As shown in particular in FIG. 5, the box 10 formed by the cover 9 and the platform 8 describes a perimeter smaller than the perimeter of the platform 8. In other words, the perimeter defined on the outside face 82 of the platform 8 by the radial walls 91 of the cover 9 is smaller than the perimeter of the platform 8. The empty space extending between the radial walls 91 and the perimeter of the platform 8 forms a bearing surface 83 for a sealing gasket. The sealing gasket serves to provide sealing for the outer shroud 3 between the elements of the ring that are upstream and downstream relative to the flow direction of the gas stream F shown in FIG. 1 by an arrow F pointing in the axial direction $D_A$ of the ring 1. The sealing gasket also serves to provide sealing between the panels 5 and the radial ends 40 of the vanes 4 to which they are fastened.

On the sides of the platforms 8 of the panels 5 that are to be in contact with the radial ends 40 of the vanes 4 via the attachment tabs 6, the outside face 82 of each platform 8 also includes two recesses 84 shaped to receive the attachment tabs 6 and enable the vanes 4 to be fastened to the panels 5. The radial walls 91 adjacent to the recesses 84 go around the recesses 84 so as to enable the vanes 4 to be coupled to the panels 5 while forming a box 10 covering the greatest possible surface area of the platform 8.

The box 10 forms a housing 11 extending between the annular wall 92 of the cover 9 and the outside face 82 of the platform 8 in the radial direction $D_R$ and extending between the radial walls 91 in a direction orthogonal to the radial direction $D_R$.

Figure 6:
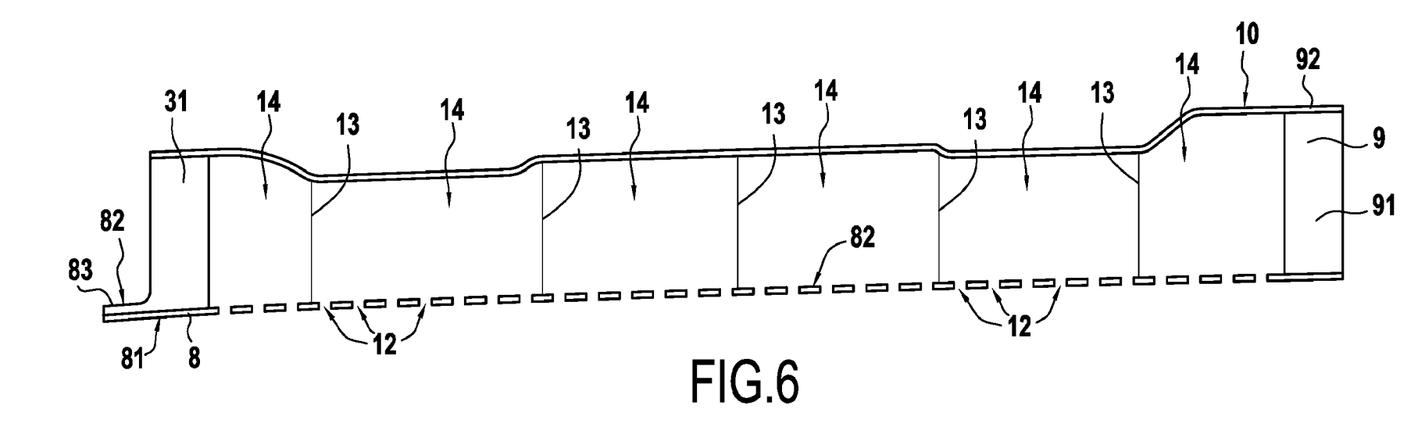
FIG. 6 is a view on a first section plane showing a FIG. 5 acoustic treatment panel.

FIG. 6 is a view of an acoustic treatment panel 5 on a first section plane VI-VI of FIG. 5.

As shown in FIG. 6, the platform 8 is perforated by through orifices 12 serving to put the flow passage 20 into communication with the housing 11 inside the box 10. The platform 8 thus forms an acoustically porous skin. The perforation fraction of the platform 8 lies in the range 5% to 12% and is preferably 10% so as to provide good sound reduction performance. The term "perforation fraction" is used to mean the ratio between the area covered by the orifices and the total area of the platform 8.

The box 10 also has partitions 13 extending in the radial direction $D_R$ between the outside face 82 of the platform 8 and the annular wall 92 of the cover 9. The partitions 13 serve to stiffen the box 10 and thus the acoustic treatment panel 5 so as to provide the outer shroud 3 with better mechanical strength. The partitions 13 also serve to form resonant cavities 14 within the housing 11 formed inside the box 10 serving to treat soundwaves transmitted through the orifices 12 from the flow passage 20 towards the resonant cavities 14 inside the box 10.

The partitions 13 may be formed by the cell partitions of a honeycomb structure. In a variant, the partitions may serve only to stiffen the acoustic treatment panel 5, with the resonant cavities being formed using a porous material, such as a viscoelastic material or a foam that is injected into the housing 11 of the box 10.

Figure 7:
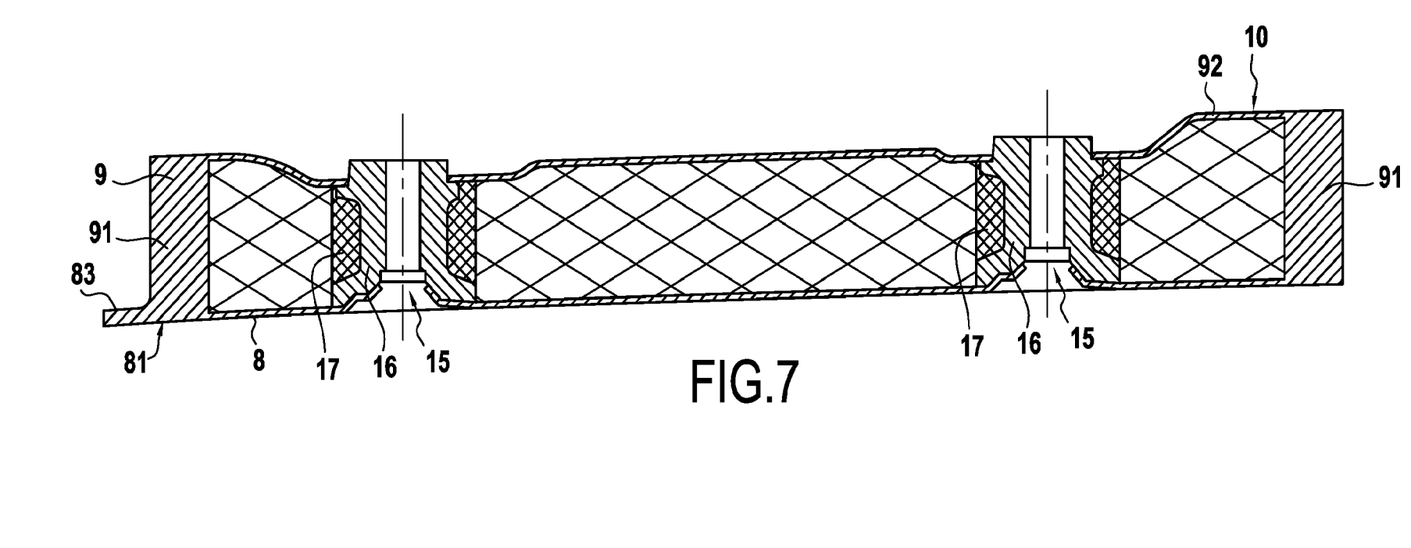
FIG. 7 is a view on a second section plane showing a FIG. 5 acoustic treatment panel.

FIG. 7 is a view of an acoustic treatment panel 5 on a second section plane VII-VII of FIG. 5.

As shown by way of example in FIGS. 5 and 7, each acoustic treatment panel 5 has two orifices 15 for fastening the acoustic treatment panel 5 to a ring support structure (not shown). The orifices 15 for fastening the panel to the ring support structure, referred to below as radial fastener orifices, pass through the box 10, i.e. they pass through the platform 8 and the cover 9. The radial fastener orifices 15 present a diameter inside the housing 11 greater than the diameter of the bolt that is to pass through the box in order to fasten the panel to the ring support structure. The diameter is greater since the box further includes both an annular metal fitting 16 and also a setback annular zone 17 inside the housing 11 for each radial fastener orifice 15, which fitting 16 is coaxial with the radial fastener orifice 15, and the setback annular zone 17 is constituted by the tubular space extending between the annular metal fitting 16 and the adjacent resonant cavities 14 of the box 10. The setback zones 17, which are kept free from the resonant cavities 14 around the radial fastener orifices 15, enable the space that remains between the fitting 16 and the resonant cavities 14 to be filled with polymer, thus making it possible to establish a transition between the fastening and the resonant cavities.

In addition, as shown in FIGS. 3 and 5, each acoustic treatment panel 5 has two resilient dampers 18 mounted on the outside face 82 of the platform 8 and passing through the annular wall 92 of the cover 9 in the radial direction $D_R$. The resilient dampers 18, also known as "bumpers", serve to attenuate the vibration of the acoustic treatment panels forming the shroud.

The ring of vanes in accordance with the invention serves to maximize the acoustic treatment for at least one of the shrouds, referred to as inner or outer annular sheaths, so as to reduce the propagation of soundwaves out from the turbine engine.

The invention claimed is:

1. A ring of vanes for an aircraft turbine engine, the ring presenting an axial direction and a radial direction and comprising:
    a first annular sheath presenting a first inside surface;
    a second annular sheath presenting a second inside surface facing the first inside surface of the first annular sheath, the first and second sheaths being coaxial and defining therebetween a flow passage for a gas stream;
    partially annular acoustic treatment panels including resonant cavities; and
    vanes extending in the radial direction between the first sheath and the second sheath,
    wherein each vane includes a radial airfoil with at least two attachment tabs at each radial end of the airfoil fastened to the first or second sheath,
    wherein the inside surface of at least one of the first and second annular sheaths and the corresponding attachment tabs are covered by the acoustic treatment panels which are arranged between the airfoils, and
    wherein each acoustic treatment panel comprises a partially annular platform and a cover cooperating with the platform to form a box, the platform presenting a first face facing the flow passage and a second face opposite from the first face, the cover including four radial walls projecting in the radial direction from the second face of the platform, and an annular wall extending substantially parallel to the platform from a first end of the radial walls remote from a second end of the radial walls secured to the second face of the platform, the box including a housing defined by the inside space extending between the second face of the platform and the cover, and having said resonant cavities arranged therein, and a perimeter of the box is smaller than a perimeter of the platform.

2. The ring according to claim 1, wherein the platform of each acoustic treatment panel includes through orifices enabling the flow passages to communicate with the resonant cavities in the acoustic treatment panel.

3. The ring according to claim 2, wherein the platform of each acoustic treatment panel presents a perforation fraction lying in the range 5% to 12% of the area covered by the platform.

4. The ring according to claim 1, wherein the box formed by assembling the cover with the platform defines a bearing surface on an outer periphery thereof for receiving a sealing gasket.

5. The ring according to claim 1, wherein each acoustic treatment panel includes at least one resilient damper mounted on the second face of the platform.

6. The ring according to claim 1, wherein the cover of each acoustic treatment panel includes an acoustically reflective layer.

7. The ring according to claim 1, wherein the box includes partitions arranged in the housing and extending in the radial direction between the outside face of the platform and the cover.

8. The ring according to claim 7, wherein the partitions are shaped to form cavities that are radially curved.

9. The ring according to claim 1, wherein each acoustic treatment panel comprises a porous material arranged in the housing of the box and defining said resonant cavities.

10. The ring according to claim 1, wherein each acoustic treatment panel comprises a honeycomb structure mounted in the housing of the box and forming cells defining said resonant cavities.

11. The ring according to claim 1, wherein the platform and the cover of each acoustic treatment panel are made of carbon composite material or of glass composite material.

12. The ring according to claim 1, wherein each acoustic treatment panel includes radial fastener orifices for fastening the panel to the first or second annular sheath, each radial fastener orifice passing through the box in the radial direction from the platform to the cover, the box further including a setback zone without any resonant cavities around each radial fastener orifice.

13. A turbine engine comprising the ring of vanes according to claim 1.

14. An aircraft comprising the turbine engine according to claim 13.

15. The ring according to claim 1, wherein the second face of the platform includes a recess shaped to receive the attachment tab.

\* \* \* \* \*